(12) United States Patent
Napolin et al.

(10) Patent No.: US 8,301,413 B2
(45) Date of Patent: Oct. 30, 2012

(54) TESTING ANALYTICS TOOL

(75) Inventors: Michael David Napolin, Middletown, DE (US); Jennifer Prem, West Chester, PA (US); Ronald A. Hollis, Jr., Bear, DE (US); Chunrong Li, Columbia, MD (US); Mei-Ling Johnson, Elsmere, DE (US); Brooke Marie Durham, Wilmington, DE (US); Michael Newbold, Jr., Hockessin, DE (US); Matthew Thomas Rice, Wilmington, DE (US); James A. Greco, Elkton, MD (US); Hans D. Schumacher, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 425 days.

(21) Appl. No.: 12/609,765

(22) Filed: Oct. 30, 2009

(65) Prior Publication Data

US 2011/0106496 A1 May 5, 2011

(51) Int. Cl.
*G06F 11/30* (2006.01)
(52) U.S. Cl. ...................................................... 702/182
(58) Field of Classification Search ................... 702/182
See application file for complete search history.

(56) References Cited

U.S. PATENT DOCUMENTS

| 2007/0094060 A1* | 4/2007 | Apps et al. ........................ 705/7 |
| 2008/0065476 A1* | 3/2008 | Klein et al. ...................... 705/14 |
| 2008/0215399 A1* | 9/2008 | Katircioglu et al. ............. 705/7 |
| 2009/0037236 A1* | 2/2009 | Miller et al. ...................... 705/7 |

* cited by examiner

*Primary Examiner* — Cindy H Khuu
(74) *Attorney, Agent, or Firm* — Michael A. Springs; Moore & Van Allen, PLLC; W. Kevin Ransom

(57) ABSTRACT

Embodiments of the invention relate to systems, methods, and computer program products for testing analytics. Embodiments herein disclosed provide for automating the collection and storage of test data, automating test performance calculations across a multitude of segments within the test group and automating test result information delivery.

26 Claims, 13 Drawing Sheets

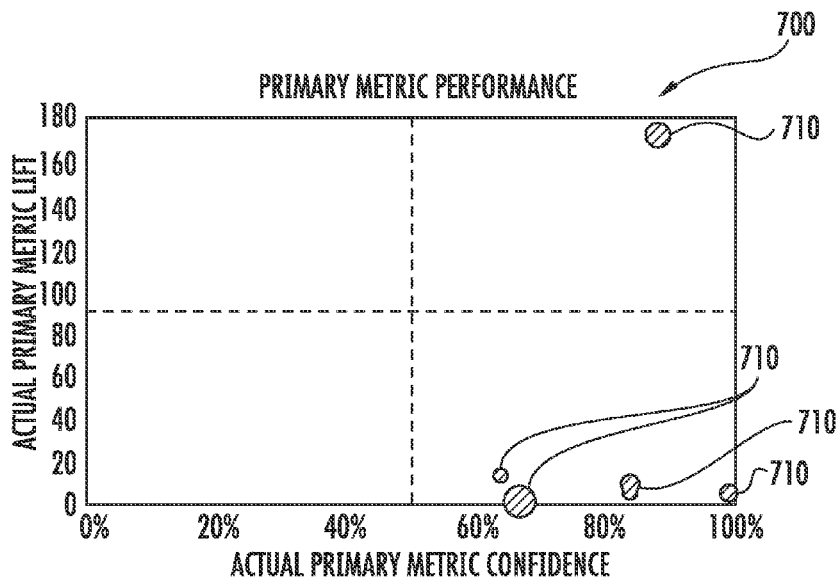

FIG. 7

| TEST NAME | PRIMARY METRIC | TEST | | | CONTROL | | | PLAN IMPACT | | | TEST AND CONTROL LIFT | | | | |
|---|---|---|---|---|---|---|---|---|---|---|---|---|---|---|---|
| | | EXP RESULT | ACT RESULT | VAR % | EXP RESULT | ACT RESULT | VAR % | EXP VOL (mm) | ACT VOL (mm) | VOL VAR % | EXP LIFT | ACT LIFT | EXP LIFT % | ACT LIFT % | LIFT VAR |
| TEST "A" | PRIMARY METRIC NO. 1 | 135 | 140 | -4% | 125 | 130 | -4% | 210.9 | 219.0 | 4% | 10 | 10 | 8% | 8% | △ |
| TEST "B" | PRIMARY METRIC NO. 2 | 23 | 24 | -4% | 22.5 | 23 | -2% | 475.8 | 496.1 | 4% | 0.5 | 1 | 2% | 4% | ○ |
| TEST "C" | PRIMARY METRIC NO. 1 | 75 | 60 | 20% | 50 | 55 | -10% | 125.0 | 115.0 | -8% | 25 | 5 | 50% | 9% | ◇ |
| TEST "D" | PRIMARY METRIC NO. 1 | 250 | 260 | -4% | 50 | 88 | -76% | 300.0 | 348.0 | -16% | 200 | 172 | 400% | 195% | △ |
| TEST "E" | PRIMARY METRIC NO. 1 | 150 | 148 | 1% | 125 | 135 | -8% | 148.7 | 153.1 | 3% | 25 | 13 | 20% | 10% | ◇ |
| TEST "F" | PRIMARY METRIC NO. 1 | 117 | 120 | -3% | 114 | 115 | -1% | 231.0 | 235.0 | 2% | 3 | 5 | 3% | 4% | ○ |
| TEST "G" | PRIMARY METRIC NO. 1 | 150 | 170 | -13% | 120 | 110 | 8% | 10.6 | 11.2 | 4% | 30 | 60 | 25% | 55% | ○ |

LEGEND: ○ ACTUAL LIFT EXCEEDING EXPECTED LIFT △ ACTUAL LIFT IS LESS THAN EXPECTED LIFT 0% TO 20% ◇ ACTUAL LIFT IS MORE THAN 20% LESS THAN EXPECTED LIFT

FIG. 8

| | PRE-TESTING PERIOD | TESTING PERIOD |
|---|---|---|
| AVG PRIMARY METRIC TEST | $22.72 | $146.43 |
| AVG PRIMARY METRIC CONTROL | $22.72 | $146.43 |
| LIFT PRIMARY METRIC | $0.08 | $0.31 |
| LIFT PRIMARY METRIC % | 0.00367168 | 0.00213937 |
| CONFIDENCE PRIMARY METRIC | 70.00% | 60.00% |

| SEGMENT NAME | TEST QTY | CONTROL QTY | % OF TOTAL QTY | LIFT ACTUAL PRIMARY METRIC | CONFIDENCE ACTUAL PRIMARY METRIC | INCREMENTAL PRIMARY METRIC | INCREMENTAL PRIMARY METRIC RANK | LIFT SECONDARY METRIC | CONFIDENCE SECONDARY METRIC | LIFT RANK SECONDARY METRIC |
|---|---|---|---|---|---|---|---|---|---|---|
| "A" | 121,739 | 121,456 | 12.23% | ($18.78) | 95.00% | ($4,566,838.42) | 26 | ($1.27) | 40.00% | 13 |
| "B" | 8,695 | 8,725 | 0.87% | $39.90 | 95.00% | $694,982.23 | 3 | $2.43 | 40.00% | 7 |
| "C" | 7,455 | 7,369 | 0.75% | $52.02 | 85.00% | $771,125.44 | 2 | ($7.69) | 55.00% | 18 |
| "D" | 2,193 | 2,138 | 0.22% | ($66.89) | 80.00% | ($289,707.03) | 20 | ($46.59) | 80.00% | 25 |
| "E" | 33,661 | 34,068 | 3.38% | $7.62 | 80.00% | $516,221.96 | 4 | $0.51 | 20.00% | 10 |

| 1702 | 1704 | 1706 | 1708 | 1710 | 1712 | 1714 | 1716 |
|---|---|---|---|---|---|---|---|
| (ALL) | TEST QTY | CONTROL QTY | BACK END METRIC PER TEST PARTICIPANT | BACK END METRIC PER CONTROL PARTICIPANT | LIFT | CONFIDENCE | INCREMENTAL BACK END METRIC |
| ALL POPULATION SEGMENTS | 995,638 | 995,638 | $401.27 | $402.71 | ($1.44) | 45.00% | ($2,865,497) |

| POPULATION SEGMENT | TEST QTY | CONTROL QTY | BACK END METRIC PER TEST PARTICIPANT | BACK END METRIC PER CONTR PARTICIPANT | LIFT | CONFIDENCE | INCREMENTAL BACK END MERTIC |
|---|---|---|---|---|---|---|---|
| SEGMENT "A" | 20,577 | 20,622 | $470.86 | $428.24 | $42.62 | 98.00% | $1,755,894 |
| SEGMENT "B" | 6,711 | 6,625 | $332.43 | $379.58 | ($47.15) | 98.00% | ($628,731) |
| SEGMENT "C" | 2,461 | 2,429 | $622.87 | $718.55 | ($95.69) | 95.00% | ($467,905) |
| SEGMENT "D" | 565,127 | 565,173 | $366.71 | $372.45 | ($5.74) | 95.00% | ($6,487,481) |
| SEGMENT "E" | 4,887 | 4,871 | $566.04 | $499.72 | $66.33 | 90.00% | $647,216 |
| SEGMENT "F" | 334 | 354 | $326.82 | $483.43 | ($156.61) | 90.00% | ($107,749) |
| SEGMENT "G" | 72,755 | 72,779 | $618.58 | $606.81 | $11.77 | 75.00% | $1,712,635 |

TESTING ANALYTICS TOOL

FIELD

In general, embodiments of the invention relate to methods, systems, apparatus and computer program products for testing analytics and, more particularly, automating the collection and storage of test data, automating test performance indicator determinations across a multitude of segments within the test participant population and automating test result information delivery.

BACKGROUND

In current business environments testing analytics is not fully leveraged to drive insight at the lowest level of detail into how to optimize investment strategies, minimize net credit losses and maximize customer relationships to create and maintain a competitive advantage, specifically market testing is a means by which business seek to remedy some of these deficiencies.

The testing process typically comprises a control group and a test group. At the onset of the test, measures are taken to insure that the control group population and the test group populations are the same. A similarity analysis is performed to ensure the same populations and eliminate any differences in the control group versus the test group populations. The same metrics are tracked over the duration of test campaign to indicate a change in test performance of the control group population versus the test group population. The metrics tracked during the test campaign, also referred to herein as the back end test metrics, as well as the front end test metrics are subsequently implemented to determine test performance indicators, such as lift and confidence associated with a specific test metric. The lift calculation provides an indication of the boost (or decline) in the test metric attributable to the test and the confidence calculation provides an insight into the predicted repeatability of the test.

In the current business environment testing and analytics results related to testing tend to be ineffectively leveraged due or otherwise lost due to organizational changes or business entities operating in silo-like environments. In addition to the inability to track performance across multiple business lines/entities, problems persist in testing related to invalid testing, such as statistical insignificance of test and control quantities and the like. Moreover, current inefficient manual test data mining procedures result in the failure to identify lost opportunities.

Additionally, current manual processes do not provide for the requisite efficiency and timeliness needed to determine test performance indicators across any and all segments of the test dataset, such as test participant population dataset or the like. Individual manual calculations must be performed, meaning all too often valuable test information goes undetected due in part by the inability to perform all of the required calculations needed to uncover these performance results.

Thus, a need exists to creating attesting analytics tool that can be leveraged across multiple business lines/entities to accelerate testing insight. In this regard, the desired system should provide for automated collection and storage of data to create a historical database of tests, expected test results, test performance data and testing impacts. Additionally, the desired system should provide for automated data transformation and synchronization to allow for data to be organized for the purpose of data mining and requisite analytic test performance reporting and synchronized to link test participants to front end and back end performance data. Further, the desired system should automate the determination of test performance indicators, such as lift and confidence, across any and all segments of the test dataset and automate the process whereby test results are presented to the user and provide multiple options to the user for generating reports, mining data and the like.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for providing automated collection and storage of test data, automated test performance indicator determinations across a multitude of segments within the test participant population and automating test result information delivery.

The automated collection and storage of test data provides a historical library of tests, test objectives, test performance data and test impacts that survives and adapts to testing entity changes, such as organizational changes, additions to the organizations or the like.

The automated test performance indicator determinations across a multitude of segments within a test participant population or other data set allows a testing entity to apply real time statistical significance/performance indicator calculations, such as lift and confidence calculations across multiple dimensions. Such statistical rigor allows for performance indicators to be determined across any combination of participant segments or other data sets. In addition, the invention provides for a testing entity to readily access test result data and drill-down or otherwise efficiently access data to the lowest data level, such as the participant level or the like.

A method for automatically providing test performance indicators defines one embodiment of the invention. The method includes receiving, at a computing device, test expectation data, test participant data, test performance data and test metric data. The method also includes determining, at the computing device, one or more test performance indicators associated with a test metric and associated with one or more predefined segments of a test dataset. The determination of the test performance indicators is based on the test expectation data, the test participant data, and the test performance data.

In one embodiment of the method, the test performance indicators are a lift calculation and a confidence calculation, otherwise referred to as a power calculation.

In one specific embodiment of the method, determining the one or more test performance indicators further includes receiving, at the computing device, a user selection of the one or more predefined segments of the test dataset and determining the one or more test performance indicators based on the user selection.

In specific embodiments of the method, determining one or more test performance indicators associated with one or more predefined segments of a test dataset, further defines the test dataset as a test participant population. According to one related embodiment of the method, the one or more predefined segments are based on test participant demographics. It should be noted that for the sake of the present invention a test "participant" is not limited to an individual but also include other entities, such as an account, an article of manufacture or the like. As such the test participant "demographics" are not limited to characteristics of individuals but may also include characteristics of the account, indicia of the article of manufacture or the like. According to other specific embodiments of the method, receiving the test participant data further includes receiving the test participant data including at least one of test participant demographics associated with each test participant or one or more predefined segments associated with each test participant. Conversely, other embodiments of the method may include determining, at the computing device, at least one of test participant demographic associated with each test participant or one or more predefined segments associated with each test participant.

According to still further embodiments the method may also include synchronizing, at the computing device, two or more of the test expectation data, the test participant data, the test performance data of the test metric data. For example, test participants may be synchronized with test performance data, test metric data or the like. In other embodiments the method may include communicating the one or more test performance indicators to a user interface application.

An apparatus for automatically providing test performance indicators provides for another embodiment of the invention. The apparatus includes a computing platform including at least one processor and a memory. The apparatus also includes a testing analytics module stored in the memory and executable by the at least one processor. The module includes a testing analytics integrator configured to receive, for a specified test, test expectation data, test participant data, test performance data and test metric data. The module also includes a testing analytics engine configured to determine one or more test performance indicators associated with a test metric and associated with one or more predefined segments of a test dataset. The determination of the test performance indicators is based on the test expectation data, the test participant data, and the test performance data.

A computer program product that includes a computer-readable medium defines yet another related embodiment of the invention. The medium includes a first set of codes for causing a computer to receive test expectation data and a second set of codes for causing a computer to receive test participant data, test performance data and test metric data. The medium additionally includes a third set of codes for causing a computer to determine one or more test performance indicators associated with a test metric and associated with one or more predefined segments of a test dataset. The determination of the test performance indicators is based on the test expectation data, the test participant data, and the test performance data.

Further, a method for providing test performance results provides another embodiment of the invention. The method includes providing a network-accessible test analytics graphical user interface (GUI) application and presenting, in the GUI application, test performance indicators determined based on test expectation data, test participant data, and test performance data. The method further includes providing for user input to the GUI application to select a segment of a test dataset as a basis for determining one or more of the test performance indicators.

In accordance with specific embodiments the method may further include presenting, in the GUI application, a governance scorecard that includes test metric performance for a plurality of tests. In such embodiments, presenting the governance scorecard further include presenting the governance scorecard that includes a graphical representation of lift calculation versus confidence calculation associated with a plurality of tests and associated with a specified ranked test metric.

Further specific embodiments of the method include presenting, in the GUI application, a test performance dashboard that includes one or more of front end test metric data, back end test metric data or segment performance data for a specified test. In such embodiments, presenting the test performance dashboard that includes the front end test metric data further includes presenting the test performance dashboard that includes the front end test metric data that includes a graphical representation of a lift calculation versus duration of the test for the specified front end test metric. In other such embodiments, presenting the test performance dashboard that includes the back end metric data further includes presenting the test performance dashboard that includes the back end test metric data that includes a graphical representation of confidence calculation versus a specified time period for the specified back end test metric. In still other such embodiments presenting the test performance dashboard that includes the segment performance data further includes presenting the test performance dashboard that includes the segment performance data that includes a graphical representation of lift calculation versus confidence calculation for a plurality of segments of test participant population and the icons representing the segments in the graphical representation are activate-able to provide access to segment test performance details.

Other embodiments of the method include presenting, in the GUI application, a data mining dashboard that provides test metric-based performance results for segments of a test, and an icon representing segments is active-able to drill-down and present test metric-based performance results for each of the plurality of segments of the test, and icons representing each of the plurality of segments are activate-able to drill-down and present test performance results for individual test participants within the segment.

In a still further embodiment the method includes presenting, in the GUI application, a custom test performance reporting interface that provides for user selection of report criteria. In such embodiments, presenting the custom test performance reporting interface further includes presenting the custom test performance reporting interface including Online Analytical Processing (OLAP) cube data structures.

An apparatus for providing to test performance results provides for another embodiment of the invention. The apparatus includes a computing platform including at least one processor and a memory. The apparatus further includes a test analytics graphical user interface (GUI) application stored in the memory, executable by the at least one processor and configured to present, network-accessible, test performance indicators determined based on test expectation data, test participant data, and test performance data. The GUI application is further configured to provide for user input to select a segment of a test dataset as a basis for determining the test performance indicators.

Yet another embodiment of the invention is defined by a computer program product that includes a computer-readable medium. The medium includes a first set of codes for causing a computer to provide network-access to a test analytics graphical user interface (GUI). The medium additionally includes a second set of codes for causing a computer to presenting, in the GUI, test performance indicators determined based on test expectation data, test participant data, and test performance data. Also the medium includes a third set of codes for causing a computer to provide for user input to the GUI to select a segment of attest dataset as a basis for determining the test performance indicators.

Thus, systems, apparatus, methods, and computer program products described in detail below provide for a testing analytic module/tool capable of automated collection and storage of test data, automated test performance indicator determinations across a multitude of segments within the test participant population and automating test result information delivery.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
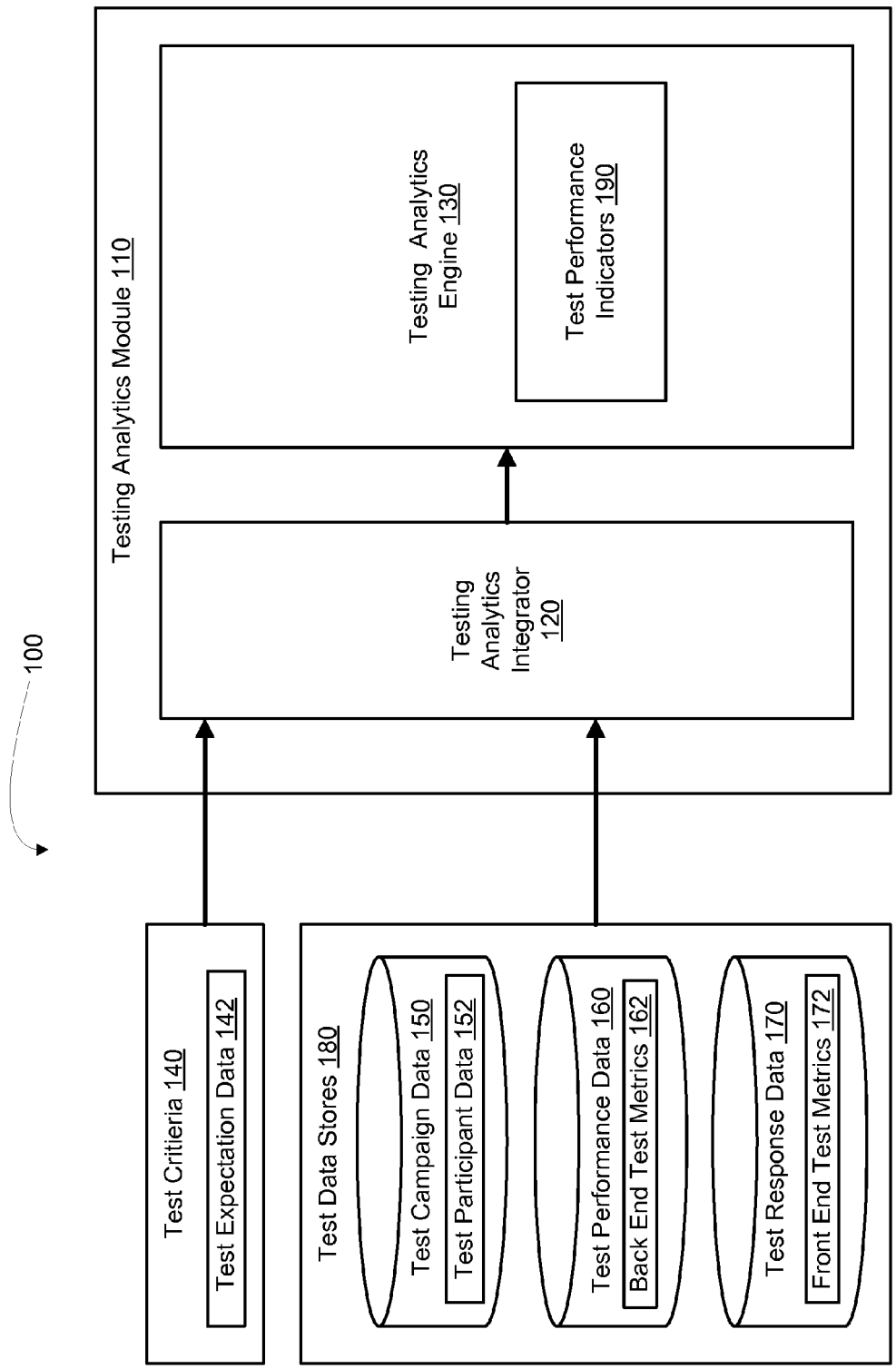
Figure 2:
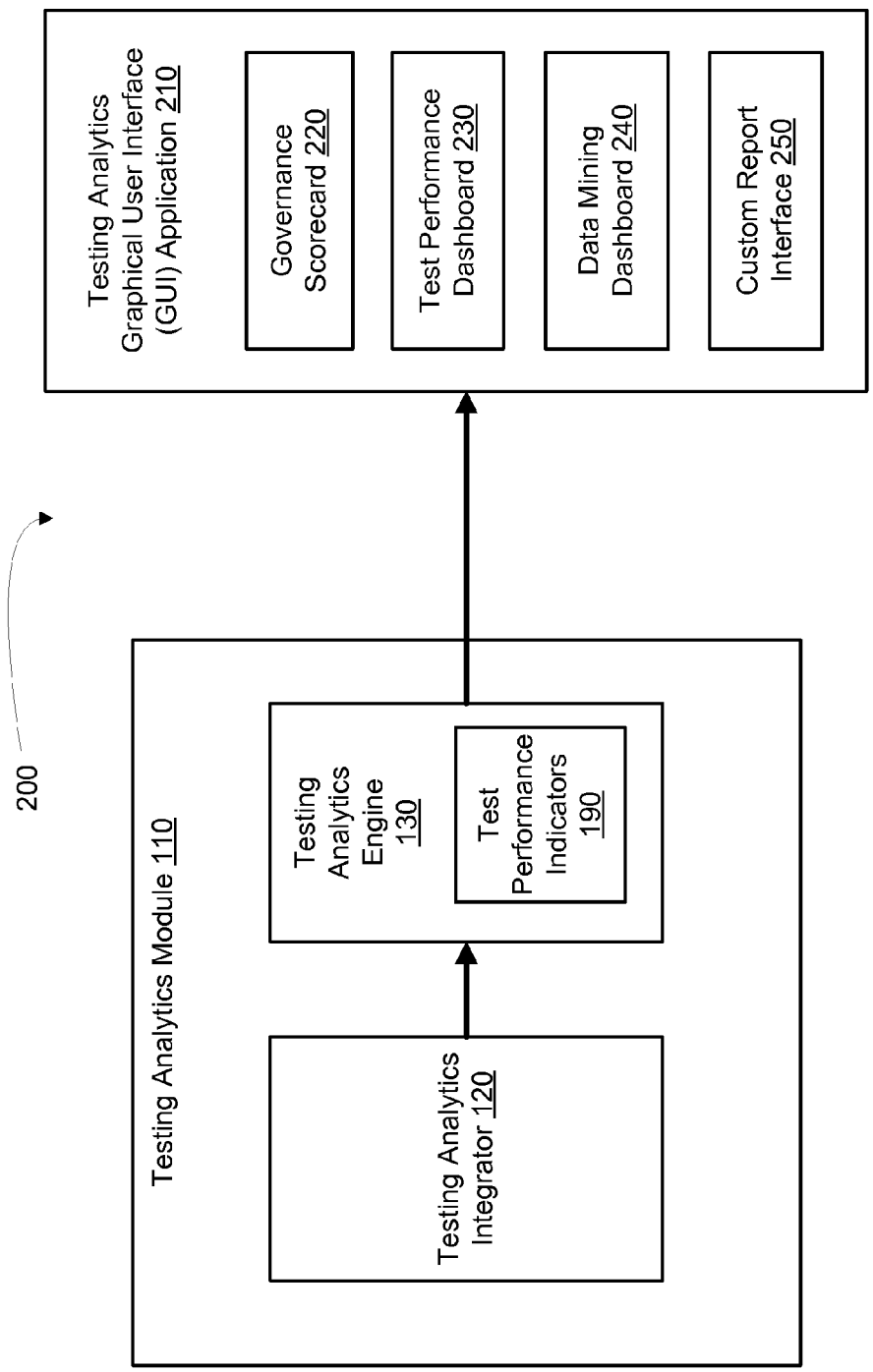
Figure 3:
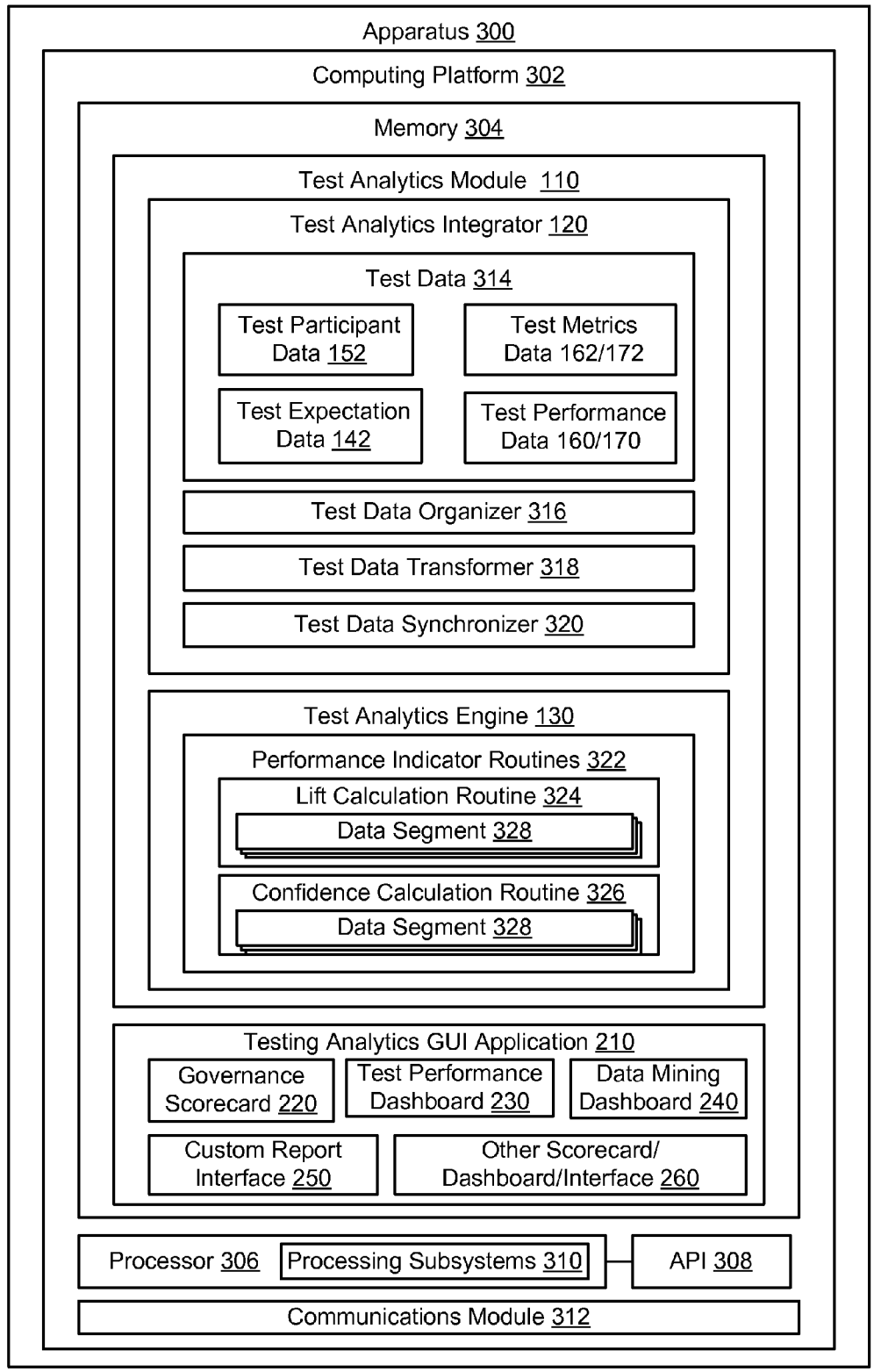
Figure 4:
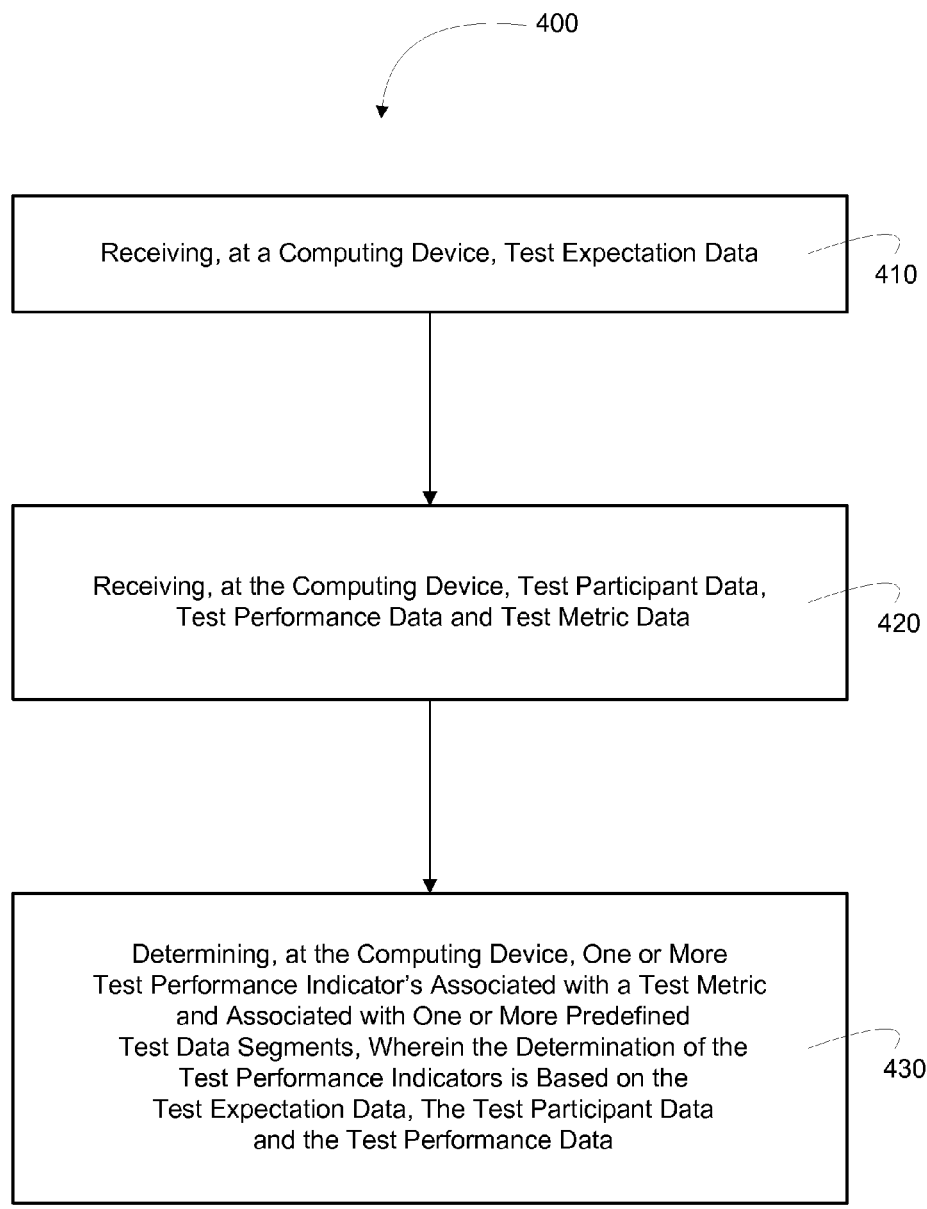
Figure 5:
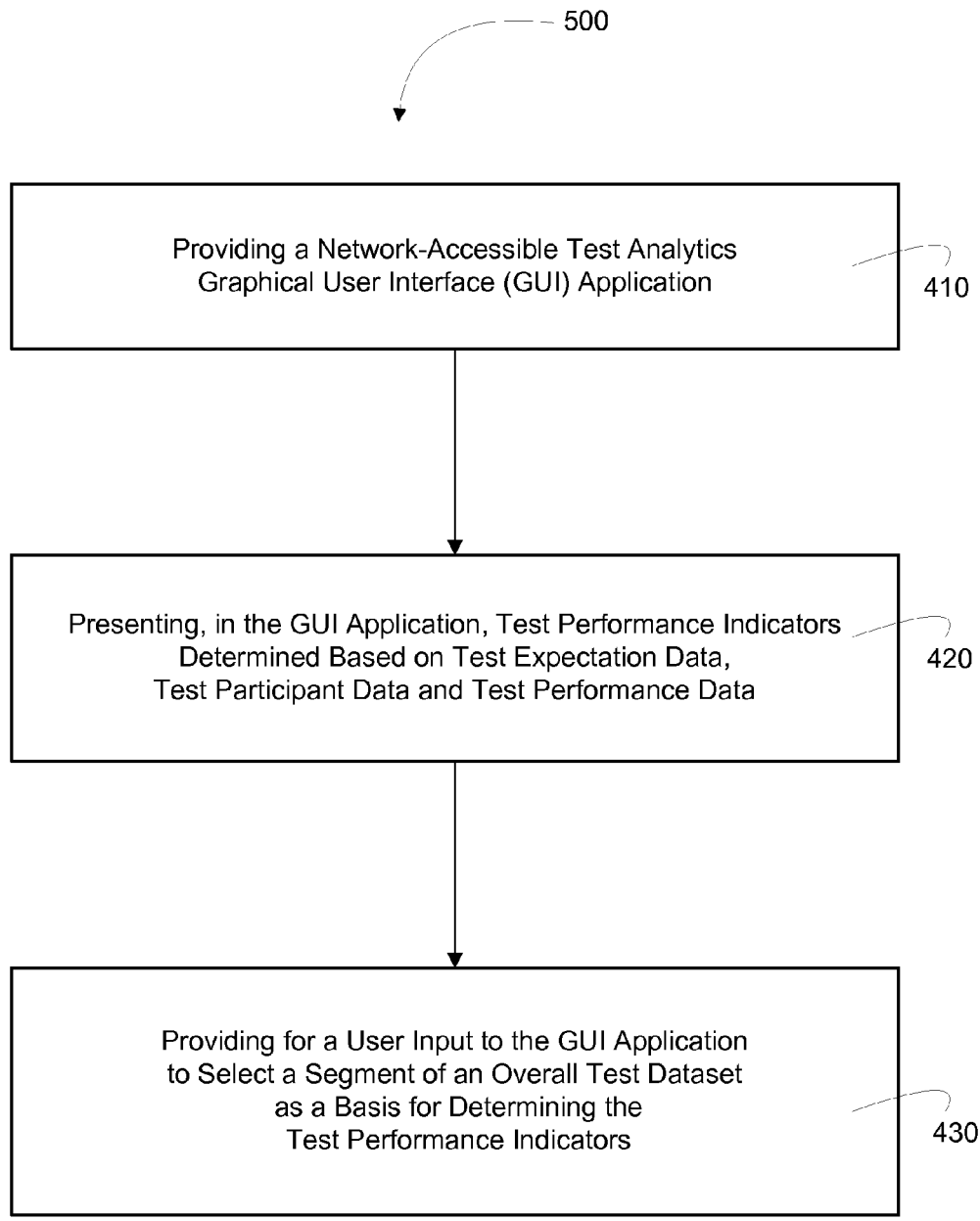
Figure 6:
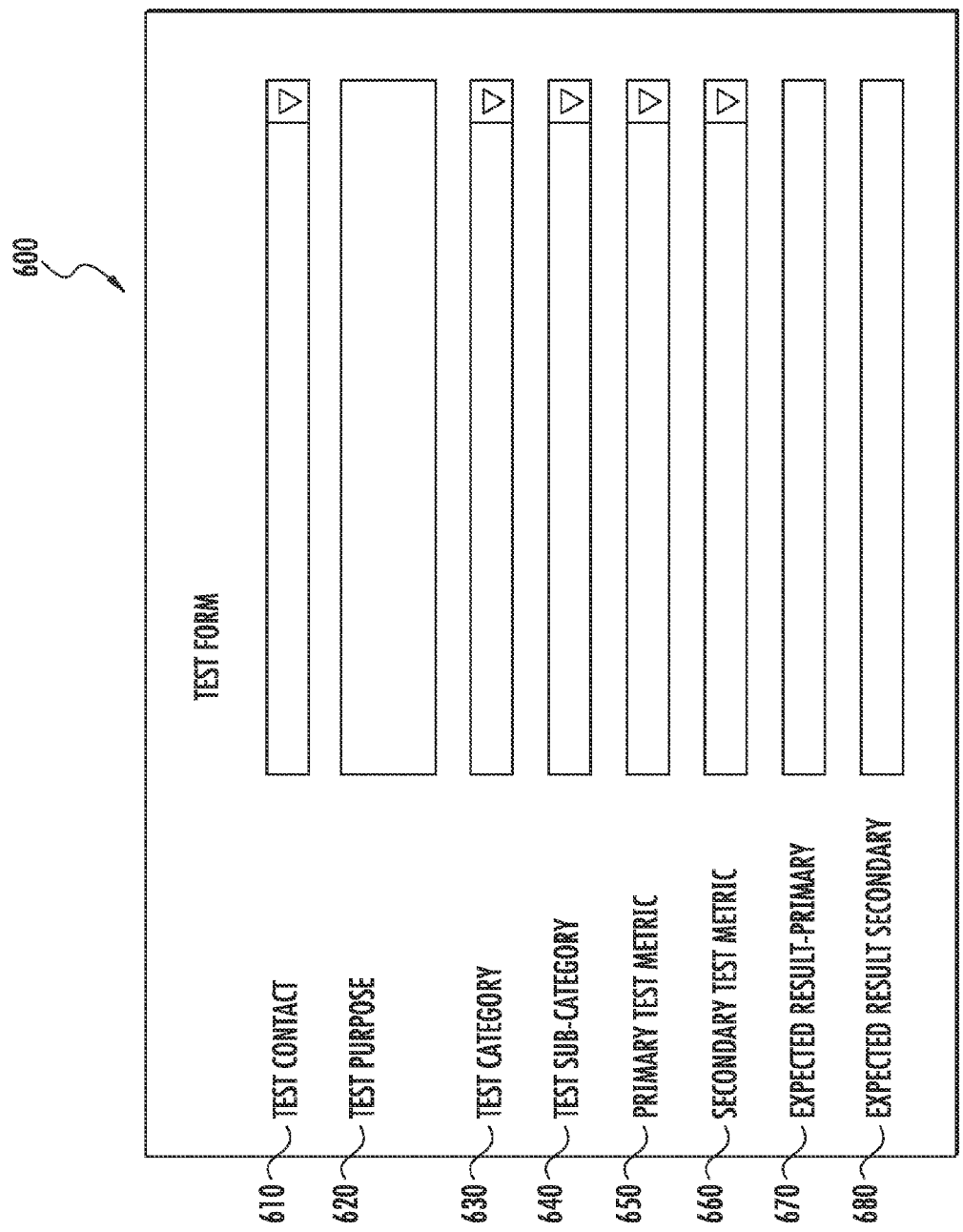
Figures 9, 10:
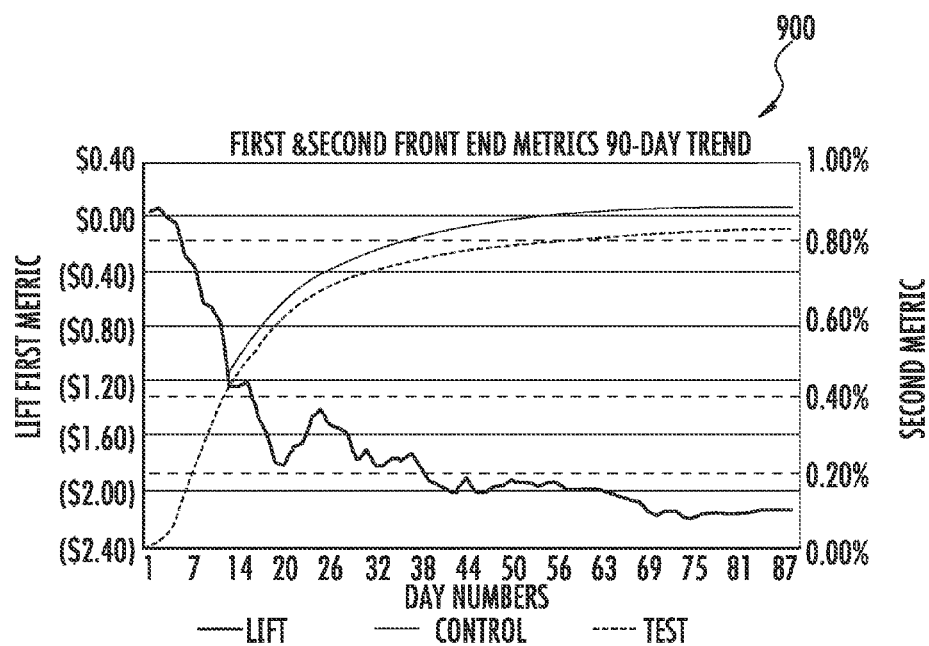
Figures 11, 12:
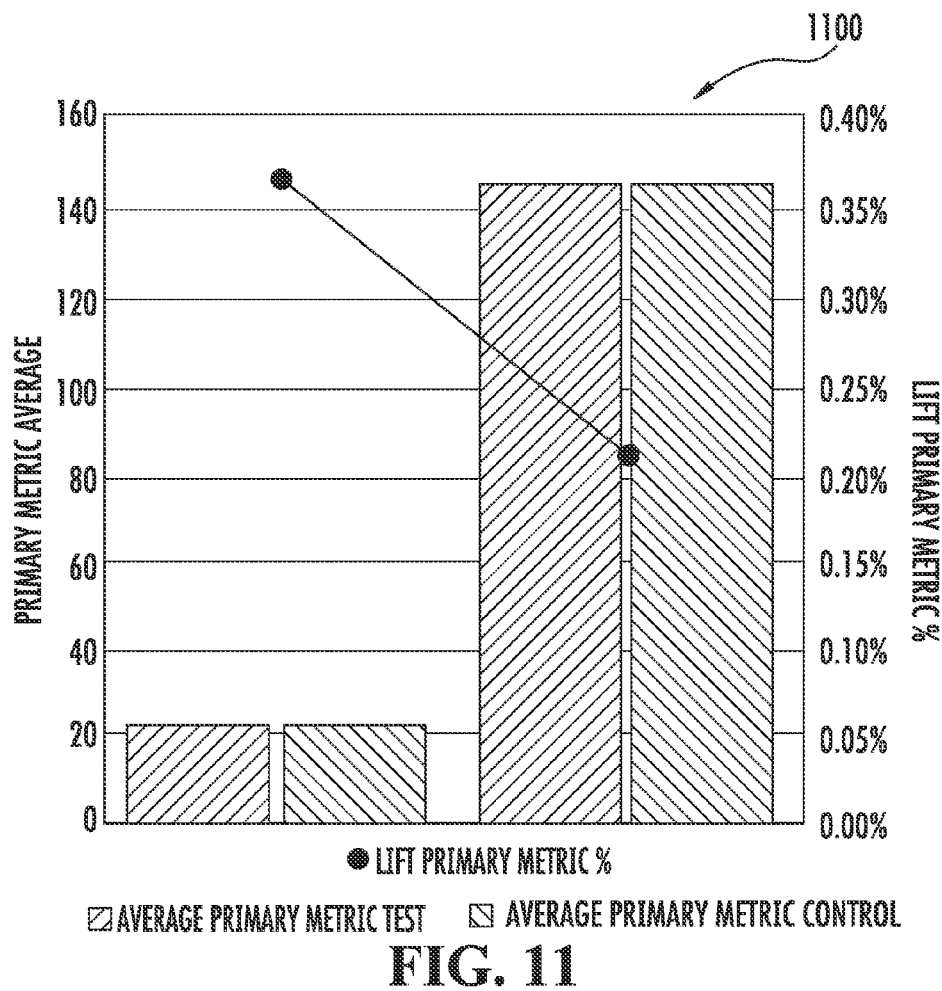
Figure 13:
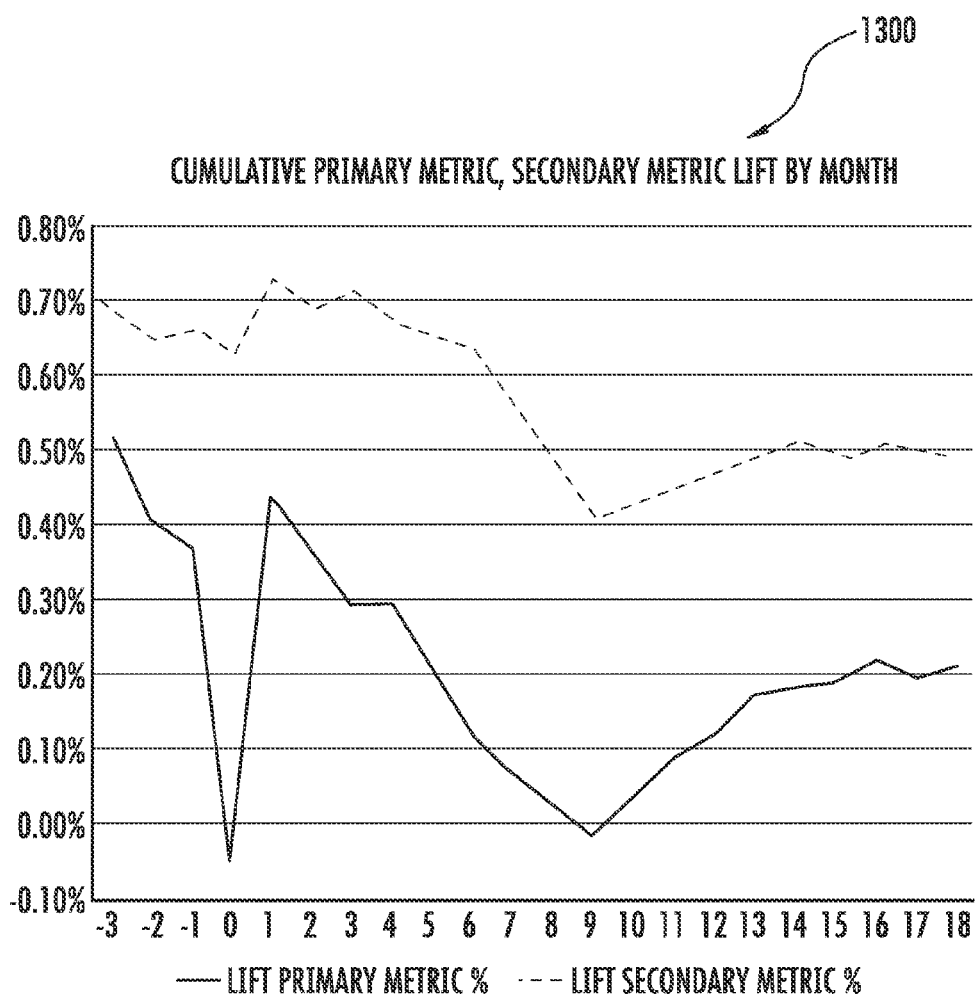
Figures 14, 15:
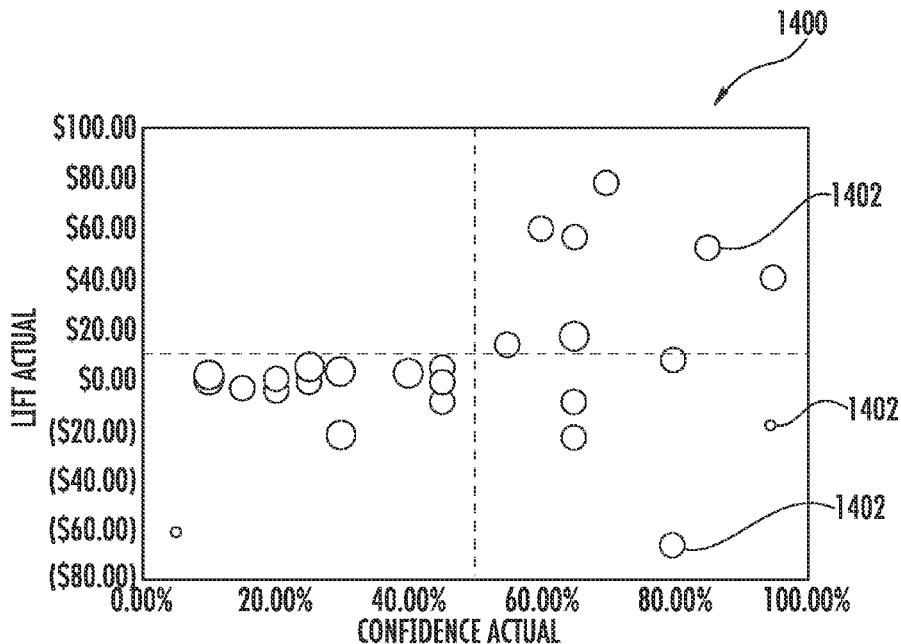
Figures 16, 17:
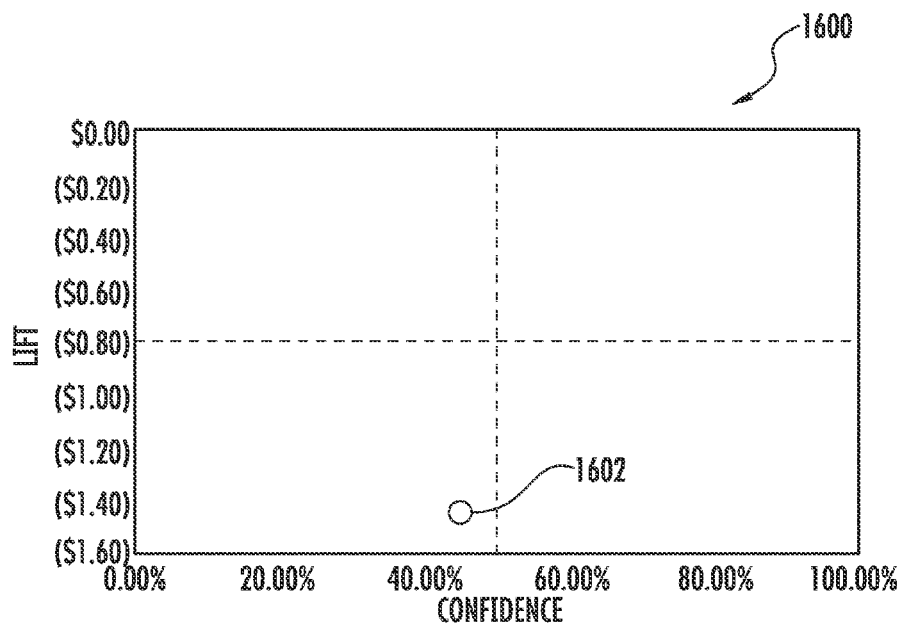
Figures 18, 19:
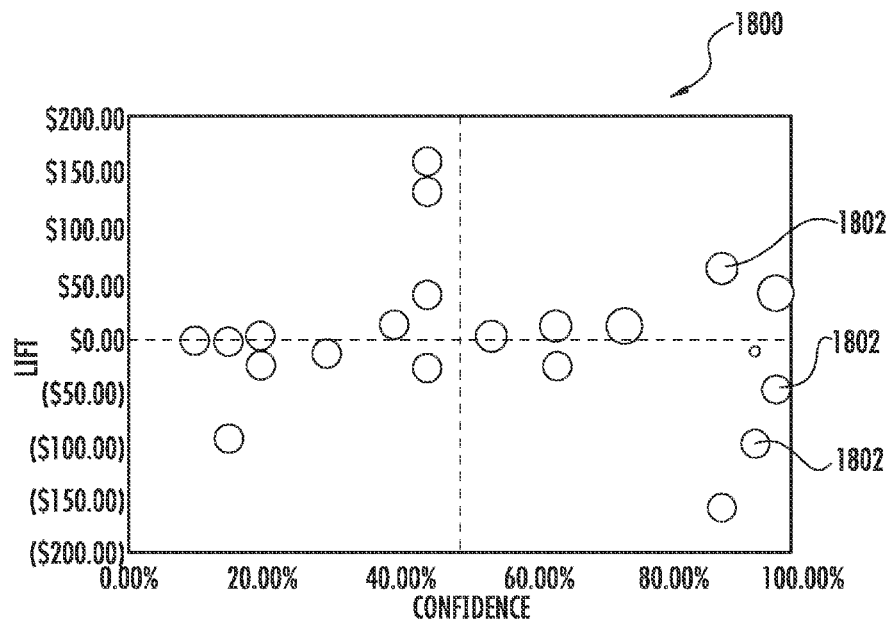

Having thus described embodiments of the invention in general terms, reference will now be made to the accompanying drawings, which are not necessarily drawn to scale, and wherein:

FIG. 1 is a block diagram of a system for testing analytics, in accordance with embodiments of the present invention;

FIG. 2 is a block diagram of another system for testing analytics highlighting a testing analytics graphical user interface application, in accordance with embodiments of the present invention;

FIG. 3 is a block diagram of an apparatus including a testing analytics module, in accordance with another embodiment of the invention;

FIG. 4 is a flow diagram of a method for providing test performance indicators, in accordance with embodiments of the present invention;

FIG. 5 is a flow diagram of a method for providing test performance results via a testing analytics graphical user interface application, in accordance with an embodiment of the present invention;

FIG. 6 is a block diagram representation of an exemplary test input form, in accordance with embodiments of the present invention;

FIG. 7 is a graph of a specified test metric performance as displayed in a governance scorecard, in accordance with embodiments of the present invention;

FIG. 8 is a grid of specified test metric performance for individual tests as displayed in a governance scorecard, in accordance with embodiments of the present invention;

FIG. 9 is a graph of a specified front end metric performance over a test campaign period as displayed in a test performance dashboard, according to one embodiments of the invention;

FIG. 10 is a grid of specified front end metric performance for a specified test as displayed in a test performance dashboard, in accordance with embodiments of the present invention;

FIG. 11 is a graph of primary front end test metric performance for control group and test group as displayed in a test performance dashboard, in accordance with embodiments of the present invention;

FIG. 12 is a grid of primary front end test metric performance for a pre-test period and test period as displayed in a test performance dashboard, in accordance with embodiments of the present invention;

FIG. 13 is a graph of cumulative primary and secondary front end test metric performance over time as displayed in a test performance dashboard, in accordance with embodiments of the present invention;

FIG. 14 is a graph of segment performance for a specified test in terms of lift versus confidence as displayed in a test performance dashboard, in accordance with embodiments of the present invention;

FIG. 15 is a grid of segment performance for specified test as displayed in a test performance dashboard, in accordance with embodiments of the present invention;

FIG. 16 is a graph of test performance in terms of lift versus confidence as displayed in a data mining dashboard, in accordance with an embodiment of the present invention;

FIG. 17 is a grid of test performance for a specified test metric of a specified test as displayed in a data mining dashboard, in accordance with an embodiment of the present invention;

FIG. 18 is a graph of test segment performance in terms of lift versus confidence as displayed in a data mining dashboard, in accordance with an embodiment of the present invention; and FIG. 19 is a grid of test segment performance for a specified test metric of a specified test as displayed in a data mining dashboard, in accordance with an embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, present embodiments herein disclosed provide for testing analytics and, more specifically, providing automated collection and storage of test data, automated test performance indicator determinations across a multitude of segments within the test participant population and automating test result information delivery. The automated collection and storage of test data provides a historical library of tests, test objectives, test performance data and test impacts that survives and adapts to testing entity changes, such as organizational changes, additions to the organizations or the like. The automated test performance indicator determinations across a multitude of segments within a test participant population allows a testing entity to apply real time statistical significance/performance indicator calculations, such as lift and confidence calculations across multiple dimensions. Such statistical rigor allows for performance indicators to be determined across any combination of participant segments or other data sets. In addition, the invention provides for a testing entity to readily access test result data and drill-down or otherwise efficiently access data to the lowest data level, such as the participant level or the like.

Referring to FIG. 1 a block diagram is depicted of a system 100 for providing testing analytics, in accordance with embodiments of the present invention. The system includes a testing analytics module 110, which includes a testing analytics integrator 120 and a testing analytics engine 130. The testing analytics integrator 120 is configured to receive test data from various networked sources. The test data includes, but may not be limited to, test criteria data 140, test campaign data 150, test performance data 160 and test response data 170.

The test criteria data 140 includes test expectation data 142 which may define expected results for one or more test metrics (i.e., measurable parameter). In accordance with one embodiment of the invention, the test expectation data is an expected lift and/or expected confidence calculation for the specified test metric. Lift is defined herein as the difference observed in the test population versus the control population for the specified test metric. For example, if the specified test metric is net profit, the lift is the difference between the net profit observed by the test population versus the net profit observed by the control population. The confidence calculation is a statistical determination of the probability that the lift will be repeated if the test is applied to the entire population or the segment of the entire population to which the test was applied.

In accordance with one embodiment of the invention test criteria data 140 may be provided via an online web-based test form, which is accessed by a user/test requester to initiate the test process. See FIG. 6 and the related discussion for an example of test criteria data 140 provided by a test form. In addition to test expectation data 142, the test form may define other test criteria data 140, such as test requestor identity, purpose of the test, test campaign period, test product(s) effected, test category, sub-test category, primary test metric, secondary test metric and the like. The web-based nature of the test form provides for the test criteria 140 to be instantaneously communicated to the testing analytics integrator 120 upon the user/test requestor inputting the requested data and subsequently submitting the data.

In one embodiment of the invention, test data stores 180 collect and store test campaign data 150, test performance data 160 and test response data 170. Test data stores 180 may comprise one or a plurality of storage devices, such as storage servers or the like. Test campaign data 150 includes test participant data 152, which includes a listing of the participants in the test population and the control population. As previously noted "participants" as herein described and claimed is not limited to individuals but may also include other entities, such as accounts, products, services or the like. In addition, in certain embodiments of the invention, the test participant data 152 may include categorical information pertaining to the test participants or the information on one or more categories/segments to which the participant belongs or is otherwise associated with. For example, if the participant is an individual, the categorical information may include behavior segmentation, risks scores pricing, affinities/affiliation of the participants and the like. In accordance with embodiments of the invention and as discussed infra, the categorical information and/or the specific categories/segments to which the participant belongs may be implemented at the testing analytics module 110 to determine individual test performance indicators 190, such as lift, confidence calculation or the like, for specific segments of the test population. In other embodiments of the invention, in which the test participant data 152 does not include categorical information and/or the specific categories/segments to which the participant belongs, the testing analytics module 110 may be configured to access other organizational or third party databases (not shown in FIG. 1) to determine the categorical information and/or the specific categories/segments to which the participant belongs.

The test performance data 160 includes back end test metric 162 performance data related to the test participants. Back end test metric are measurement parameters taken during the test campaign and/or at the completion of the test campaign. For example, if the test participants are accounts and, specifically, financial institution accounts, the back end test metrics 162 include the financial performance over the duration of the test campaign for the test population accounts and the control population accounts. In this example, the back end metrics 162 may include revenues, fees, profitability and the like, which are subsequently implemented at the testing analytics module 110 to determine test performance indicators 190, such as lift and/or confidence calculation for each individual back end test metric.

The test response data 170 includes front end test metric 172 performance data, which indicate how the participant responded to the test. Front end test metrics are measurement parameters defined at the onset of the test. For example, if the test includes an offer to the participant, how the participant responds to the offer may define a front end test metric or an account balance transfer and the balance transfer amount may define a front end test metric.

In one embodiment of the invention, the test campaign data 150, the performance data 160 and the test response data 170 are communicated to the testing analytics module 110 on a predetermined schedule, such as daily, weekly, monthly or the like. In other embodiments of the invention, the test campaign data 150, the performance data 160 and the test response data 170 may be communicated in real-time as the data becomes available or, in other instances, the testing analytics module 110 may be configured to request current data on an as-needed basis, such as prior to determining test performance indicators 190 or the like. The testing analytics module 110 may store the data by participant and/or by date prior to performing further processing on the test data.

In addition to receiving the test data, in certain embodiments of the invention, the test analytics integrator 120 is configured to perform other functions such as organization/integration of the test data, transformation of raw test data into user-readable data, and synchronization of test data. In one embodiment of the invention, automated organization of the data includes organizing and storing the data in a relational data schema and/or an Online Analytical Processing (OLAP) cube (also referred to in the art as a multidimensional cube or a hypercube). Organization of the test data in the relational data schema and/or OLAP cube provides analytic performance for data reporting purposes. In other embodiments of the invention, synchronization of the data includes linking test participants to performance data, such as back end test metrics, front end test metrics or the like.

The testing analytics engine 130 is configured to determine the test performance indicators 190, which are associated with a test metric and one or more predefined segments of the test data, such as one or more segments of the overall test participant population. It should be noted that a segment may be defined as any portion of the test data and/or overall test participant population, including the entire data set/test participant population. The test performance indicators, such as lift, confidence calculation or the like, are determined based on the test expectation data, the test participant data, and the test performance data. In this regard, the test analytics engine 130 is configured to determine running sums for all front end and back end metrics (i.e., performance data) that is used for calculations of lift and/or confidence. In one embodiment of the invention, the testing analytics engine 130 is configured to determine test performance indicators 190 for each predetermined segment of the test data, such as each predetermined segment of the overall test participation population.

As previously noted, in specific embodiments of the invention, the segments may be defined within the test participant data 152 or determined based on category/segment information included in the test participant data 152. In other embodiments the segments may be determined by the testing analytics module 110 by accessing organization databases or third party databases to determine categories/segments and/or information related to category/segments. In still further embodiments of the invention, segments may be defined, either from a listing or ad hoc, by the user/administrator.

In specific embodiments of the invention, the determination of test performance indicators 190 for each of the segments may be automatically determined for all defined segments upon receiving the requisite test data. In other embodiments, the determination of test performance indicators 190 may occur based on the user/administrator selecting a segment from a list of segments or creating a segment based on user/administrator selected segment criteria.

Referring now to FIG. 2 a block diagram is illustrated of a system 200 for automated information delivery by a test analytics module 110, in accordance with an embodiment of the present invention. The test analytics module 110 is configured to provide users access to data through a test analytics graphical user interface (GUI) application 210. As depicted, the GUI application 210 may be a standalone application external from the testing analytics module or, in alternate embodiments, the GUI application may be included within the test analytics module. The testing analytics GUI application provides analytical capabilities to generate and display scorecards, dashboards, data mining functionality, OLAP performance reporting, relational querying at test participant level, event triggering distribution of reports, report scheduling, self-serve report creation and the like.

In accordance with specific embodiments of the invention, the testing analytics GUI application 210 may include governance scorecard 220, test performance dashboard 230, data mining dashboard 240 and/or custom report interface 250. Governance dashboard 220 includes overall testing performance results for the organization, in accordance with specific embodiments. For example, the governance dashboard 220 may be configured to display test performance results broken down by specific test metrics. The specific test metric may be the primary test metric, the secondary test metric and/or the like, or the specific test metric may be a named test metric, such as net income before taxes (NIBT) or the like. In one specific embodiment of the invention, the governance dashboard presents a graphical representation of lift versus confidence for the specified metric (an example of the graphical representation is shown in FIG. 7 and discussed infra.). In further specific embodiments of the invention, the governance dashboard includes a grid that breakdowns performance results by test, specified test metric, test group expected and actual results, control group expected and actual results, plan impact (i.e., lift applied to rollout), and test and control expected and actual lift (an example of the grid is shown in FIG. 8 and discussed infra.)

Test performance dashboard 230 includes performance results for a specific test, in accordance with specific embodiments of the invention. The performance results may include breakdown data for front end test metrics, back end test metrics, segment performance metrics and the like. In one specific embodiment, front end test metrics may be presented in the dashboard in the form of a graphical representation of lift and response time versus time (i.e., campaign duration expressed in days or the like) for a specified front end metric. The front end metric may be the defined primary front end metric or any other front end metric defined in the test response data 170. The graphical representation may indicate response time for the control group and the test group, which provide forecast capability using designated time period response curves (an example of the graph is shown in FIG. 9 and discussed infra.) In other specific embodiments, the front end metrics may presented in the dashboard in the form of a grid that breakdown test performance for one or more front end metrics and may include test group and control group front end metric performance, variance of the front end metric, confidence calculation of the front end metric and the like. (An example of the grid is shown in FIG. 10 and discussed infra.)

In another specific embodiment, the test performance dashboard includes back end metric data. The back end metric data may be provided in the form of a graphical representation of control group and test group lift per specified back end metric, such as the primary metric or the like (an example of the graph is shown in FIG. 11 and discussed infra.) The back end metric data may also be provided in the form of a grid that breakdowns the specified test metric, such as the primary test metric or the like, in terms of test group and control group pre-testing period and testing period. The breakdown may include, but is not limited to, average specified test metric for test group, average specified test metric for control group, lift for the specified test metric, lift percentage for the specified test metric and confidence calculation for the specified test metric. (An example of the grid is shown in FIG. 12 and discussed infra.) Additionally, back end metric data may also be provided in an additional graphical representation of cumulative lift per time period, such as a month or the like for one or more specified test metrics, such as the primary and secondary test metrics or the like. The additional graphical representation provides for displaying cumulative lift prior to the inception of the test period as a means of readily identify the effect of the test. (An example of the graph is shown in FIG. 13 and discussed infra.)

In other specific embodiments, the dashboard application includes segment performance test data. The segment performance test data may be presented in the form of a graphical representation of lift versus confidence for each predefined segment. In one embodiment, each segment is represented on the graph by a bubble icon. The bubble icons may be activated (i.e., clicked-on or otherwise engaged) to drill down or otherwise present detail segment test performance data, such as test data for each individual participant within the test segment. In addition, the size of the bubbles may represent a test rollout estimate, such as the potential rollout earnings across the entire segment within the organization or overall population. (An example of the graph is shown in FIG. 14 and discussed infra.) Additionally, the segment performance test data may be presented in the form of a grid that breakdowns test performance for a plurality of the predefined segments. The grid may include, but is not limited to, test group quantity, control group quantity, percentage of overall population in test/control group, lift for specified test metric, confidence for specified test metric, incremental profit/loss if rolled out to entire segment population, rank of segment in terms of incremental roll-out profit/loss and the like. (An example of the grid is shown in FIG. 15 and discussed infra.)

Data mining dashboard 240 provides a means for the user/administrator to drill down or otherwise readily access test performance data on a segment level, a participant level or any other level of the overall test population. As such, data mining dashboard 240 may include a graphical representation of lift versus confidence for a specified test metric of a specified test. The test-level performance data may be represented in the graph by a bubble icon, which may be activated (i.e., clicked-on or otherwise engaged) to drill down or otherwise present detail segment performance data. (An example of the graph is shown in FIG. 16 and discussed infra.) The test-level performance data may also be represented in a grid that includes a test identifier, the quantity of test group participants, the quantity of control group participants, the specified test metric per test group participant (i.e., average), the specified test metric per control group participant (i.e., average), lift of the specified test metric, confidence of the specified test metric and incremental profit/loss if the test is rolled-out to the entire population. (An example of the grid is shown in FIG. 17 and discussed infra.).

Additionally, data mining dashboard 240 may include a graphical representation of lift versus confidence for each of the predefined segments of a specified test. The segment-level performance data may be represented in the graph by a bubble icon, which may be activated (i.e., clicked-on or otherwise engaged) to drill down or otherwise present test performance data of the individual participants within the segment. (An example of the graph is shown in FIG. 18 and discussed infra.) The segment-level performance data may also be represented in a grid that includes a segment identifier, the quantity of test group participants in the segment, the quantity of control group participants in the segment, the specified test metric per test group participant (i.e., average), the specified test metric per control group participant (i.e., average), lift of the specified test metric, confidence of the specified test metric and incremental profit/loss if the test is rolled-out to the entire segment population. (An example of the grid is shown in FIG. 19 and discussed infra.).

The custom report interface 250 is configured to allow the user/administrator to create and publish custom design reports. In one embodiment that implements OLAP cube performance reporting, the user/administrator may choose applicable test data criteria and/or category parameters to create a test data set/segment. Alternatively, other relational querying at the test-level and/or at the segment-level may be implemented to create custom reports and the like. In specific embodiments of the invention, the custom report interface may be configured to allow for the user/administrator to generate and/or communicate the custom reports based on a predetermined schedule and/or a trigger event, such as a specific occurrence of a performance event associated with the test or the like.

FIG. 3 provides a more detailed depiction of the apparatus 300, according to further embodiments of the present invention. In addition to providing greater detail, FIG. 3 highlights various optional embodiments. The apparatus 300 may include any type and/or combination of one or more computing devices, such as servers, personal computers, or the like. The apparatus 300 includes computing platform 302 that is operable to receive and execute modules, routines and applications, such as testing analytics module 110, testing analytics GUI application 210 and the like. Computing platform 302 includes memory 304, which may comprise volatile and nonvolatile memory such as read-only and/or random-access memory (RAM and ROM), EPROM, EEPROM, flash cards, or any memory common to computing platforms. Further, memory 304 may include one or more flash memory cells, or may be any secondary or tertiary storage device, such as magnetic media, optical media, tape, or soft or hard disk.

Further, computing platform 302 also includes processor 306, which may be an application-specific integrated circuit ("ASIC"), or other chipset, processor, logic circuit, or other data processing device. Processor 306 or other processor such as ASIC may execute an application programming interface ("API") layer 308 that interfaces with any resident programs, such as testing analytics module 110, testing analytics GUI application 210 or the like, stored in the memory 108 of apparatus 102.

Processor 306 includes various processing subsystems 310 embodied in hardware, firmware, software, and combinations thereof, that enable the functionality of apparatus 300 and the operability of the apparatus on a network. For example, processing subsystems 310 allow for initiating and maintaining communications, and exchanging data, with other networked devices. It should be noted that any of the modules, sub-modules, and routines shown and described as being in memory 304 may alternatively be embodied in processing subsystems 310.

The memory 304 of apparatus 300 includes the aforementioned testing analytics module 110, which includes a testing analytics integrator 120 and a testing analytics engine 130. The testing analytics integrator 120 is configured to receive test data from various networked sources. As previously noted the test data includes, but may not be limited to, test expectation data 142, test participant data 152, test performance/response data 160/170 and/or test metric data 162/172.

In addition to receiving the test data, in certain embodiments of the invention, the test analytics integrator 120 is configured to perform other functions such as organization/integration of the test data, transformation of raw test data into user-readable data, and synchronization of test data. In accordance with optional embodiments of the invention, the testing analytics integrator 120 may include test data organizer 316 configured to provide automated organization of the data including organizing and storing the data in a relational data schema and/or an Online Analytical Processing (OLAP) cube. In other optional embodiments, the testing analytics integrator 120 may include test data transformer 318 configured to transform the received raw data into a format conducive to further processing, such as performance indicator processing or the like and to transform the test data into user-readable data operable to be presented in the testing analytics GUI application 210. In other optional embodiments, the testing analytics integrator 120 may include a test data synchronizer 320 configured to synchronize and/or link the test data, such as linking the test to test participants and/or linking the test participants to performance data and/or the like.

The testing analytics engine 130 is configured to determine the test performance indicators which are associated with a test metric and one or more predefined segments of the test data, such as one or more segments of the overall test participant population. Thus, in accordance with specific embodiments, the testing analytics engine may include one or more performance indicator routines 322 configured to determine or otherwise calculate a performance indicator. In one embodiment, in which the performance indicators are further defined as lift and confidence, the performance indicator routines 322 include a lift calculation routine 324 and a confidence calculation routine 326, each of which is configured to provide a respective lift and confidence calculation for one or more data segments 328, such as a participant segment based on an identifying characteristic of the participant segment or the like.

The memory 304 of apparatus 300 additionally includes a test analytics graphical user interface (GUI) application 210. As depicted, the GUI application 210 may be a standalone application external from the testing analytics module 110 or, in alternate embodiments, the GUI application may be included within the test analytics module 110. The testing analytics GUI application provides analytical capabilities to generate and display scorecards, dashboards, data mining functionality, OLAP performance reporting, relational querying at test participant level, event triggering distribution of reports, report scheduling, self-serve report creation and the like. As such, in specific embodiments of the invention, the testing analytics GUI application 210 may include governance scorecard 220, test performance dashboard 230, data mining dashboard 240 and/or custom report interface 250 or other scorecard/dashboard/interface 260.

Governance dashboard 220 includes overall testing performance results for the organization, in accordance with specific embodiments. Test performance dashboard 230 includes performance results for a specific test, in accordance with specific embodiments of the invention. Data mining dashboard 240 provides a means for the user/administrator to drill down or otherwise readily access test performance data on a segment level, a participant level or any other level of the overall test population. The custom report interface 250 is configured to allow the user/administrator to create and publish custom design reports.

Turning the reader's attention to FIG. 4, a flow diagram is provided of a method 400 for automatically providing test performance indicators, in accordance with an embodiment of the present invention. At Event 410, test expectation data is received at a computing device. According to one specific embodiment of the method, the test expectation data may include expected lift and confidence calculations for one or more test metrics associated with a test. Additionally, according to other specific embodiments, the test expectation data may be received as part of a test input form filled out online by a test requester. In addition to defining test expectations, the test form may define other test criteria, such as test purpose, test category, test sub-category, primary and secondary test metrics and the like.

At Event 420, test participant data, test performance data, and test metric data are received at the computing device. As previously noted, the term "participants" includes individuals, as well as, other test entities, such as accounts, products or the like. The participant data may include a listing of both test group and control group participants. Test performance data is associated with back end and/or front end test metrics and provides inputs for test performance indicator calculations. The test participant data test performance data, and test metric data may be pulled from test stores on a predetermined schedule, requested on a need basis or otherwise communicated to the computing device as it becomes available.

At Event 430, one or more test performance indicators associated with a test metric and associated with one or more segments of a test dataset, such as test participant population dataset are determined. The test performance indicators are determined based on the test performance data, the test participant data and the test expectation data. According to one specific embodiment, the test performance indicators include lift and confidence calculation. In one specific embodiment, a user selection is received at the computing device to select the one or more segments of the test dataset and the determination of the test performance indicators is performed based on the user selection.

Referring to FIG. 5 a flow diagram is presented of a method 500 for providing test performance results, in accordance with embodiments of the present invention. At Event 502, a network-accessible test analytics Graphical User Interface (GUI) application is provided. The test analytics GUI application may be web-accessible or intranet-accessible.

At Event 504, test performance indicators, such as lift and/or confidence, are presented in the test analytics GUI interface. The test performance indicators are determined based on test expectation data, test participant data and test performance data. In alternate embodiments, the test performance indicators may be presented in conjunction with a governance scorecard, a test performance dashboard, a data mining dashboard or the like. The governance scorecard provides test metric performance data for a plurality of tests. The test performance dashboard provides back end metric, front end metric and/or segment performance for a specified test. A data mining dashboard provides test performance data for a test, test segments and/or test participants and allows the user to drill-down from test to test segment and test segment to individual participant to access the associated test performance data.

At Event 506, a user input is provided for within the test analytics GUI application to select a segment of a test dataset, such as a test participant population dataset, as a basis for determining the test performance indicators.

Referring to FIG. 6 a block diagram depicted of an exemplary test form 600 which may be used to initiate a test and define testing criteria, in accordance with an embodiment of the present invention. It should be noted that FIG. 6 is limited to only some of the test parameters/criteria included in a typical test form and, for the sake of brevity, does not include all of the possible test parameters/criteria that may be included on a test form. Test form 600 includes a test contact field 610 for indicating the individual requesting the test and/or responsible for being the contact for the test. As shown, the test contact may be selected from a pull down menu or, in other embodiments, the test contact may be manually inputted.

The test form 600 additionally includes test purpose field 620 for providing a test purpose dialog box in which a test requester inputs the purpose of the requested test. The test form 600 also includes test category field 630 and sub category field 640 for defining the category of the test and, where applicable, the sub-category of the test. As shown, the test category and the sub-category may be selected from a corresponding pull-down menu or, in other embodiments, the test contact/user may manually input category and/or sub-category.

Additionally, test form 600 includes primary test metric field 650 and secondary test metric field 660 for defining the primary test metric and the secondary test metric for the requested test. The primary test metric is defined as the most important test metric for the associated test and the secondary test metric is the second most important test metric for the associated test. As shown, the primary test metric and secondary test metric may be selected from a corresponding pull-down menu or, in other embodiments, the test contact/user may manually input the primary test metric and/or the secondary test metric.

The test form 600 also includes expected result primary metric field 670 and expected result secondary metric 680 for defining the expected results for the primary and secondary test metrics. The expected results allow the testing analytics module to determine test performance indicators, such as expected lift and the like.

FIGS. 7-19 provide various example of graphs, grids and the like, which may be presented as part of a testing analytics GUI application, in accordance with an embodiment of the present invention. Referring to FIG. 7, a graph 700 is depicted of primary metric performance for a plurality of tests, such as tests currently ongoing within a testing entity and/or tests completed in a predetermined time frame. The graph 700 is typically included in a governance dashboard that highlights test metric performance, such as primary and secondary test metric performance, across a plurality of tests. Graph 700 depicts actual primary metric confidence in percent along the x-axis and actual primary metric lift along the y axis. The bubble icons 710 in the graph 700 represent individual tests. The bubble icons 710 may be activated, by clicking-on the icon or the like, to present test performance data related to that specific test. Additionally, the size of the bubble icons 720 may represent a test characteristic, such as the potential for rollout profitability across the remaining un-tested population. The upper right-hand quadrant is the desired area for a test to reside in, since it provides for higher lift and higher confidence for the test metric.

FIG. 8 is a grid 800 depicting primary metric performance for a plurality of tests, such as tests currently ongoing within a testing entity and/or tests completed in a predetermined time frame. The grid 800 is typically included in a governance scorecard that highlights test metric performance, such as primary and secondary test metric performance, across a plurality of tests and is typically presented in unison with the graph shown in FIG. 7. The grid includes columns for test name 802, the primary metric in the test 804, the expected result of the primary metric for the test group 806, the actual result for the primary metric for the test group 808 and the variance in percentage for the expected result versus the actual result of the primary metric in the test group 810. The grid 800 also includes columns for the expected result of the primary metric for the control group 812, the actual result for the primary metric for the control group 814 and the variance in percentage for the expected result versus the actual result of the primary metric in the control group 816.

Additionally, grid 800 includes planned impact data, which reflects the lift that may occur if the test is rolled out across the entire non-test population. Thus, grid 800 includes columns for expected plan impact in volume 818, actual planned impact in volume 820 and the variance in percentage for the expected planned impact and the actual planned impact 822. The grid 800 also includes columns for expected lift for the primary metric 824, actual lift for the primary metric 826, expected lift percentage for the primary metric 828, actual lift in percentage for the primary metric 830 and lift variance for the expected lift versus the actual lift for the primary metric 832. As opposed to numeric values, column 832 includes icons that represent the lift variance. For example, a circle represents actual lift exceeding the expected lift, a triangle represents actual is less than expected lift by 0-20 percent and a diamond represents actual lift is more than 20 percent less that expected lift.

Referring to FIG. 9, a graph 900 is depicted of front end metric performance for a specific test. The graph 900 is typically included in a test performance dashboard that highlights test performance in terms of front end metrics, back end metrics and segment performance. Graph 900 depicts the previous "x" number of days in the test along the x-axis and the lift of the first front end test metric and actual performance data of the second front end test metric along the y axis. Thus, the thicker solid line represents the lift for the first front end test metric, the thinner solid line represent the actual control group performance data for the second front end test metric in terms of a percent, and the dotted line represents the actual test group performance data for the second front end test metric in terms of percent.

FIG. 10 is a grid 1000 depicting front end test metric performance for a specified test. The grid 1000 is typically included in a test performance dashboard individual test performance and is typically presented in unison with the graph shown in FIG. 9. The grid 1000 includes columns for test name 1002, the test group performance data for the second front end test metric in terms of percent 1004, the control group performance data for the second front end test metric in terms of percent 1006 and the variance between the test group performance data and the control group performance data for the second front end test metric in terms of percent 1008. The grid 1000 also includes the test group performance data for the first front end test metric 1010, the control group performance data for the first front end test metric 10126, the variance between the test group performance data and the control group performance data for the first front end test metric in terms of percent 1014 and the confidence calculation for the first front end test metric 1016.

Referring to FIG. 11, a graph 1100 is depicted of back end metric performance for a specific test. The graph 1100 is typically included in a test performance dashboard that highlights test performance in terms of front end metrics, back end metrics and segment performance. Graph 1100 is a bar graph that indicates in the two left most bars, the primary metric average per test group and control group participant and indicates in the two rightmost bars, the lift of the primary metric per test group and control group. Additionally the line graph within graph 1100 represents the lift average for the primary metric.

FIG. 12 is a grid 1200 depicting back end test metric performance for a specified test. The grid 1200 is typically included in a test performance dashboard individual test performance and is typically presented in unison with the graph shown in FIG. 11. The grid 1200 includes rows for average primary metric test group 1202, average primary metric control group 1204, lift for the primary metric 1206, lift percentage for the primary metric 1208 and confidence calculation for the primary metric 1210, the grid also includes columns for representing the pre-testing period 1212 and the testing period 1214 as a means of indicating performance prior to the test and during and/or after the test.

Additionally, FIG. 13 depicts another graph 1300 of the cumulative lift by month for the primary back end test metric and the secondary back end test metric. Graph 1300 depicts time in months along the x-axis (the negative numbers reflect months prior to the inception of the test) and the lift in terms of percentage along the y axis. The solid line represents the lift of the primary test metric and the dotted line represents the lift of the secondary test metric.

Referring to FIG. 14, a graph 1400 is depicted of segment performance for a specific test. The graph 1400 is typically included in a test performance dashboard that highlights front end and back end test metric performance and segment performance. Graph 1400 depicts confidence for a specified test metric in percent along the x-axis and lift for the specified test metric along the y-axis. The bubble icons 1402 in the graph 1400 represent individual segments of the test dataset. The bubble icons 1402 may be activated, by clicking-on the icon or the like, to present the test performance data associated with the individual participants within that particular segment. Additionally, the size of the bubble icons 1402 may represent a test characteristic, such as the potential for rollout profitability across the remaining un-tested population. The upper right-hand quadrant is the desired area for a segment to reside in, since it provides for higher lift and higher confidence for the test metric.

FIG. 15 is a grid 1500 depicting primary metric performance for a plurality of data set segments within an individual test. The grid 1500 is typically included in a test performance dashboard that highlights front end and back end test metric performance and segment performance and is typically presented in unison with the graph shown in FIG. 14. The grid includes columns for segment name 1502, quantity of test group participants in the segment 1504, quantity of control group participants in the segment 1506, the percentage of test/control participants versus entire non-test segment population 1508, the lift of the primary test metric 1510 and the confidence calculation of the primary test metric 512.

Additionally, grid 1500 includes columns for incremental profit/loss for the primary metric if the test is rolled out across the entire non-test segment population 1514, a ranking of the test segment in terms of incremental profit/loss 1516, a lift for a secondary test metric for the segment 1518, a confidence calculation for the secondary metric for the segment 1520 and a ranking of the test segment in terms of lift for the secondary test metric 1522.

Referring to FIG. 16 a graph 1600 is depicted of a specified test metric for a specific test. The graph 1600 is typically included in a data mining dashboard that allows users to drill down from test-level to segment-level and from segment-level to participant-level and the like. Graph 1600 depicts confidence for a specified test metric in percent along the x-axis and lift for the specified test metric along the y-axis. The bubble icon 1602 in the graph 1600 represents the test. The bubble icons 1402 may be activated, by clicking-on the icon or the like, to present the segment test performance details. Additionally, the size of the bubble icon 1602 may represent a test characteristic, such as the potential for rollout of a particular test metric across the remaining un-tested population.

FIG. 17 is a grid 1700 depicting specified test metric performance for an individual test. The grid 1700 is typically included in a data mining dashboard that highlights provides for user to drill down for data analysis and is typically presented in unison with the graph shown in FIG. 16. The grid includes columns for test name 1702, quantity of test group participants 1704, quantity of control group participants 1706, the average specified test metric performance for each test group participant 1708, the average specified test metric performance for each control group participant 1710, the lift of the primary test metric 1712, the confidence calculation of the primary test metric 1714 and the incremental profit/loss for the specified metric if the test is rolled out across the entire non-test population 1716.

Referring to FIG. 18, a graph 1800 is depicted of segment performance for a specific test. The graph 1800 is typically included in a data mining dashboard that allows users to drill down from test-level to segment-level and from segment-level to participant-level and the like. Graph 1800 depicts confidence for a specified test metric in percent along the x-axis and lift for the specified test metric along the y-axis. The bubble icons 1802 in the graph 1800 represent individual segments of the test dataset. The bubble icons 1402 may be activated, by clicking-on the icon or the like, to present the test performance data associated with the individual participants within that particular segment. Additionally, the size of the bubble icons 1402 may represent a test characteristic, such as the potential for rollout profitability across the remaining un-tested population.

FIG. 19 is a grid 1900 depicting primary metric performance for a plurality of data set segments within an individual test. The grid 1900 is typically included in a data mining that allows users to drill down from test-level to segment-level and from segment-level to participant-level and the like and is typically presented in unison with the graph shown in FIG. 18. The grid includes columns for segment name 1902, quantity of test group participants in the segment 1904, quantity of control group participants in the segment 1906, the average specified test metric performance for each test group participant in the segment 1908, the average specified test metric performance for each control group participant in the segment 1910, the lift of the primary test metric in the segment 1912, the confidence calculation of the primary test metric in the segment 1914 and the incremental profit/loss for the specified metric if the test is rolled out across the entire non-test segment population 1916.

Thus, systems, apparatus, methods, and computer program products herein described provide for a testing analytic module/tool capable of automated collection and storage of test data, automated test performance indicator determinations across a multitude of segments within the test participant population and automating test result information delivery. The automated collection and storage of test data provides a historical library of tests, test objectives, test performance data and test impacts that survives and adapts to testing entity changes, such as organizational changes, additions to the organizations or the like. The automated test performance indicator determinations across a multitude of segments within a test participant population or other data set allows a testing entity to apply real time statistical significance/performance indicator calculations, such as lift and confidence calculations across multiple dimensions. Such statistical rigor allows for performance indicators to be determined across any combination of participant segments or other data sets. In addition, the invention provides for a testing entity to readily access test result data and drill-down or otherwise efficiently access data to the lowest data level, such as the participant level or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for automatically providing test performance indicators, the method comprising:
receiving, at a computing device, test expectation data including an expected lift and an expected confidence for a test metric included within a test, wherein the expected lift is defined as an expected difference to be observed in a test population versus a control population and the expected confidence is defined as an expected probability that an observed lift will be repeated if the test is applied to an overall population;
receiving, at the computing device, test participant data, test performance data and test metric data; and
determining, at the computing device, one or more test performance indicators associated with the test metric and associated with one or more predefined segments of a test dataset, wherein the determination is based on the test expectation data, the test participant data, and the test performance data and wherein the test performance indicators include a lift and a confidence, wherein the lift is defined as a difference in the test population versus the control population and the confidence is defined as a probability that the lift will be repeated if the test is applied to the overall population.

2. The method of claim 1, wherein determining the one or more test performance indicators further comprises receiving, at the computing device, a user selection of the one or more predefined segments of the test dataset and determining the one or more test performance indicators based on the user selection.

3. The method of claim 1, wherein determining the one or more test performance indicators further comprises determining the one or more test performance indicators associated with the test metric and associated with one or more predefined segments of a test participant population.

4. The method of claim 3, wherein determining the one or more test performance indicators further comprises determining the one or more test performance indicators associated with the one or more predefined segments of the test participant population, wherein the one or more predefined segments are based on test participant demographics.

5. The method of claim 4, wherein receiving the test participant data further comprises receiving the test participant data including at least one of test participant demographics associated with each test participant or one or more predefined segments associated with each test participant.

6. The method of claim 4, further comprising determining, at the computing device, at least one of test participant demographic associated with each test participant or one or more predefined segments associated with each test participant.

7. The method of claim 1, further comprising synchronizing, at the computing device, two or more of the test expectation data, the test participant data, the test performance data or the test metric data.

8. The method of claim 1, wherein receiving the test expectation data further comprises receiving the test expectation data based on user inputs to a network-based test initiation form.

9. The method of claim 1, further comprising communicating the one or more test performance indicators to a user interface application.

10. An apparatus for automatically providing test performance indicators, the apparatus comprising:
a computing platform including at least one processor and a memory; and
a testing analytics module stored in the memory, executable by the at least one processor and including,
a testing analytics integrator configured to receive, for a specified test, test expectation data, test participant data, test performance data and test metric data, wherein the test expectation data includes an expected lift and an expected confidence for a test metric included with a test and wherein the expected lift is defined as an expected difference to be observed in a test population versus a control population and the expected confidence is defined as an expected probability that an observed lift will be repeated if the test is applied to an overall population, and a testing analytics engine configured to determine one or more test performance indicators associated with the test metric and associated with one or more predefined segments of a test dataset, wherein the determination is based on the test expectation data, the test participant data, and the test performance data and wherein the test performance indicators include a lift and a confidence, wherein the lift is defined as a difference in the test population versus the control population and the confidence is defined as a probability that the lift will be repeated if the test is applied to the overall population.

11. The apparatus of claim 10, wherein the testing analytics module further comprises a testing analytics graphical user interface (GUI) application configured to provide network accessibility to testing analytics and provide for user input of the one or more predefined segments of the test dataset.

12. The apparatus of claim 11, wherein the testing analytics engine is further configured to receive the user input and determine the one or more test performance indicators based on the user input of the one or more predefined segments of the test dataset.

13. The apparatus of claim 11, wherein the testing analytics GUI application is further configured to receive the one or more testing performance indicators and provide user accessibility to the one or more testing performance indicators.

14. The apparatus of claim 10, wherein the test dataset is further defined as test participant population.

15. The apparatus of claim 14, wherein the one or more predefined segments are based on test participant demographics.

16. The apparatus of claim 14, wherein the test participant data includes at least one of test participant demographic data associated with each test participant or one or more predefined segments associated with each test participant.

17. The apparatus of claim 14, wherein the analytics test module further comprises a test participant demographic routine configured to determine at least one of test participant demographic associated with each test participant or one or more predefined segments associated with each test participant.

18. The apparatus of claim 10, wherein the test analytics integrator further comprises a test data synchronizer configured to synchronize, to the specific test, one or more of the test expectation data, the test participant data, the test performance data or the test metric data.

19. A computer program product comprising:
a non-transitory computer-readable medium including computer instructions stored therein for causing a computer processor to perform:
receiving test expectation data including an expected lift and an expected confidence for a test metric included within a test, wherein the expected lift is defined as an expected difference to be observed in a test population versus a control population and the expected confidence is defined as an expected probability that an observed lift will be repeated if the test is applied to an overall population;
receiving test participant data, test performance data and test metric data; and
determining one or more test performance indicators associated with a test metric and associated with one or more predefined segments of a test dataset, wherein the determination is based on the test expectation data, the test participant data, and the test performance data and wherein the test performance indicators include a lift and a confidence, wherein the lift is defined as a difference in the test population versus the control population and the confidence is defined as a probability that the lift will be repeated if the test is applied to the overall population.

20. The computer program product of claim 19, wherein determining the one or more test participant indicators further comprises receiving a user selection of the one or more predefined segments of the test dataset and determine the one or more test performance indicators based on the user selection.

21. The computer program product of claim 19, wherein determining the one or more test performance indicators further comprises determining the one or more test performance indicators associated with the test metric and associated with one or more predefined segments of a test participant population.

22. The computer program product of claim 21, wherein determining the one or more test performance indicators further comprises determining the one or more test performance indicators associated with the one or more predefined segments of the test participant population, wherein the one or more predefined segments are based on test participant demographics.

23. The computer program product of claim 22, wherein receiving the test participant data further comprises receiving the test participant data including at least one of test participant demographics associated with each test participant or one or more predefined segments associated with each test participant.

24. The computer program product of claim 22, wherein the computer instructions further cause the computer processor to perform determining at least one of test participant demographic associated with each test participant or one or more predefined segments associated with each test participant.

25. The computer program product of claim 19, wherein the computer instructions further cause the computer processor to perform synchronizing, to a specified test, at least one of the test expectation data, the test participant data, the test performance data or the test metric data.

26. The computer program product of claim 19, wherein the computer instructions further cause the computer processor to perform communicating the one or more test performance indicators to a user interface application.

* * * * *